July 3, 1956

R. C. FINK 2,752,832

ROAD ROLLER WITH RETRACTABLE TRANSPORTING WHEELS

Filed March 1, 1952

INVENTOR;
ROBERT C. FINK,
BY
ATT'Y

July 3, 1956  R. C. FINK  2,752,832
ROAD ROLLER WITH RETRACTABLE TRANSPORTING WHEELS
Filed March 1, 1952  4 Sheets-Sheet 3
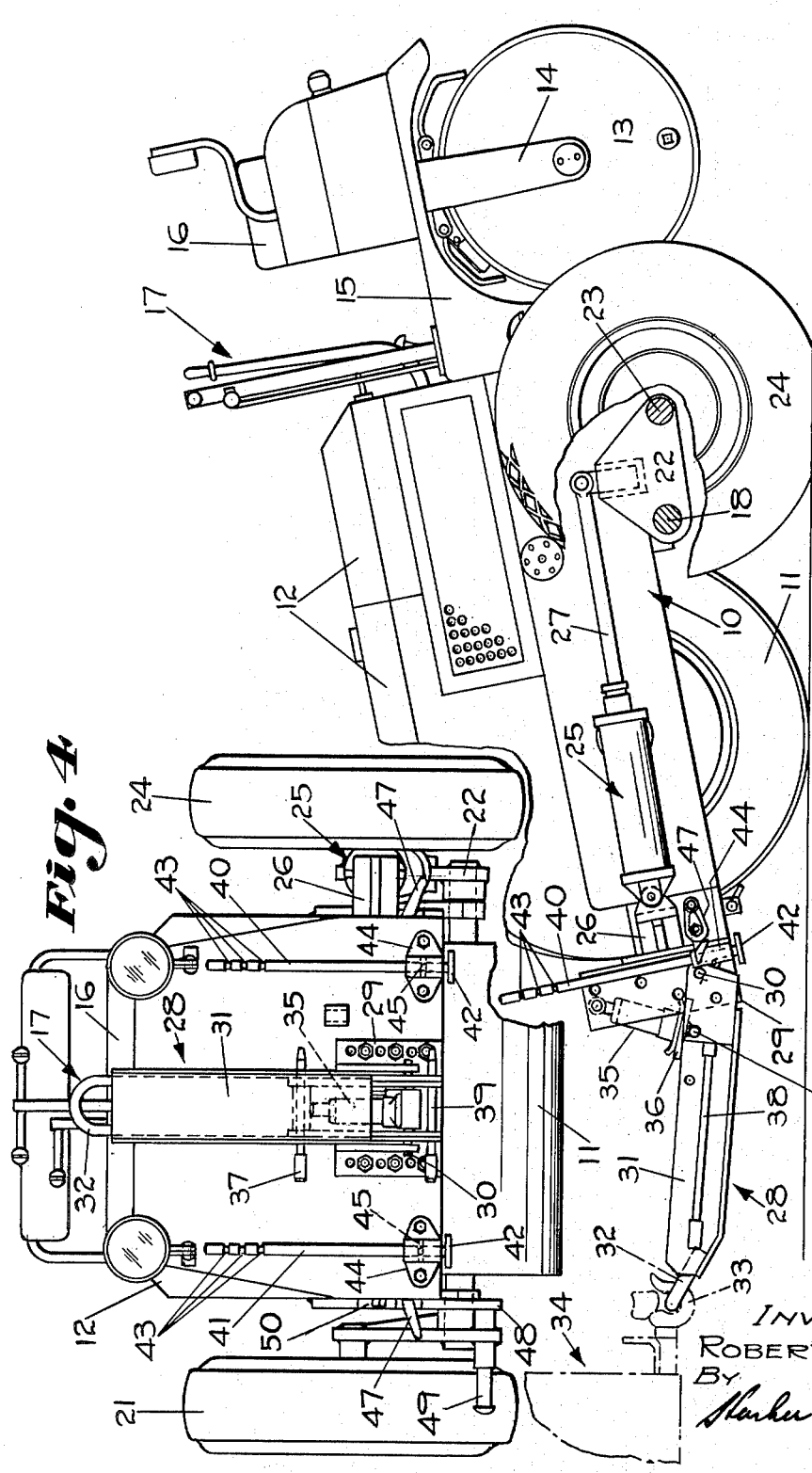
INVENTOR;
ROBERT C. FINK,
BY
ATT'Y.

July 3, 1956  R. C. FINK  2,752,832
ROAD ROLLER WITH RETRACTABLE TRANSPORTING WHEELS
Filed March 1, 1952  4 Sheets-Sheet 4

INVENTOR;
ROBERT C. FINK,
BY
ATT'Y.

United States Patent Office 2,752,832
Patented July 3, 1956

2,752,832

ROAD ROLLER WITH RETRACTABLE TRANSPORTING WHEELS

Robert C. Fink, Galion, Ohio, assignor to The Galion Iron Works & Manufacturing Company, a corporation of Ohio Application March 1, 1952, Serial No. 274,379

1 Claim. (Cl. 94—50)

This invention relates to a road roller, and an object of the invention is to provide such a roller with improved retractable transporting wheels and a hitch whereby the entire roller may be lifted off the ground, except for the retractable wheels, and hitched to the rear end of a pulling vehicle, such as a truck, tractor or the like, the weight of the roller being largely supported by the retractable wheels, part of the weight, however, being carried by the pulling vehicle which also stabilizes the roller during transportation.

A further object of the invention is to provide improved apparatus of the above mentioned type in which there is a pair of aligned retractable wheels located outside the main frame of the roller, the wheels being carried on the free ends of swinging crank arms attached to a transversely extending normally horizontal shaft to insure their upward and downward movement together, the wheels being raised and lowered by a single double acting jack cooperating with one of the crank arms. The axis of the retractable supporting wheels is preferably transversely of the main frame and near to but rearwardly of the front driven roll of the roller and rearwardly of the center of gravity of the roller independently of said retractable wheels.

A further object of the invention is to provide a roller of the general characteristics above described which carries retractable means for holding the front of the roller off the ground when said retractable wheels are in their roller elevating positions and the roller hitch is disengaged from the towing and stabilizing or supporting vehicle.

Other objects of the invention will appear hereinafter, the novel features and combinations being set forth in the appended claim.

Figures 5, 5A, 6:
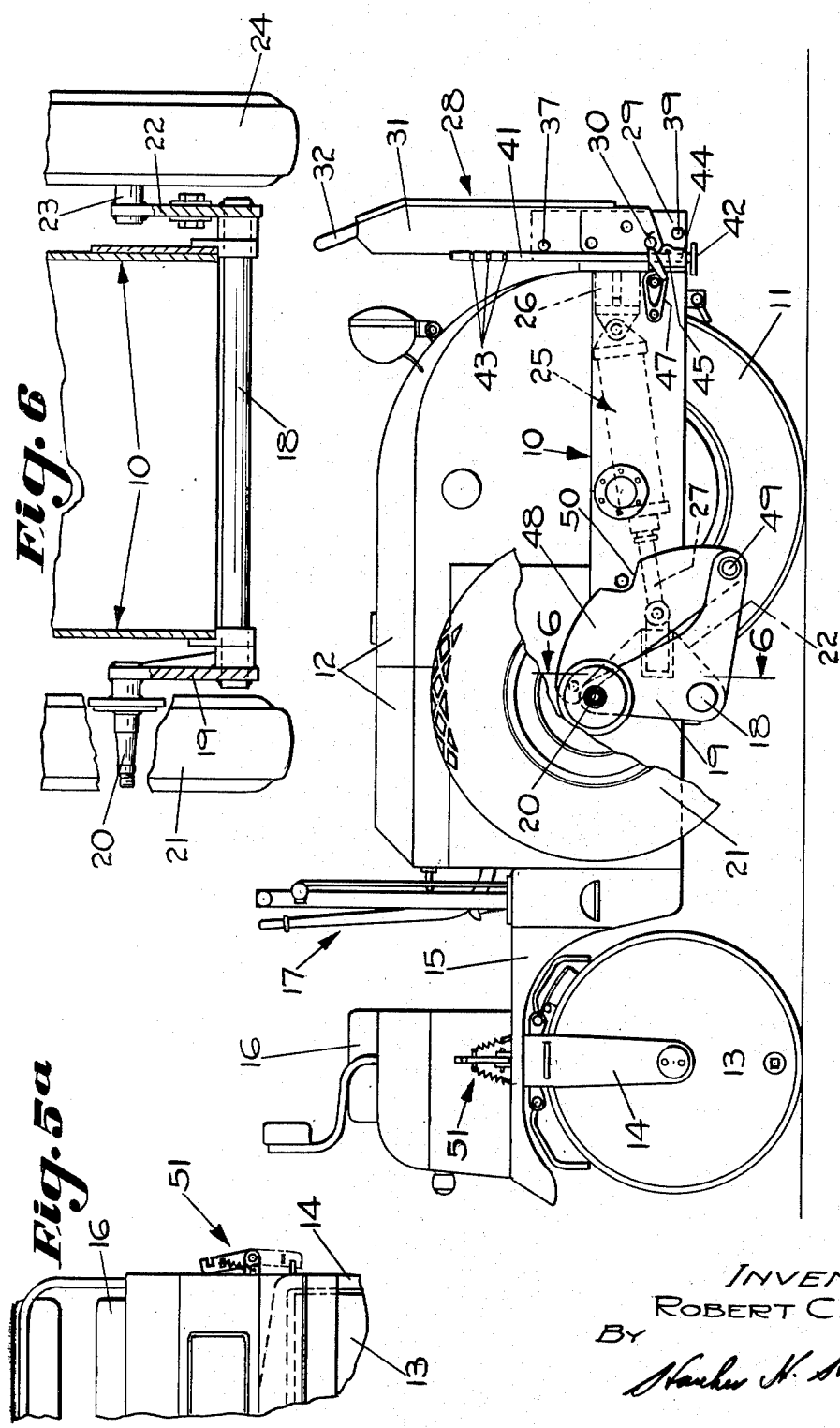

Fig. 3 illustrates the roller, with parts broken away, showing an intermediate operation wherein the retractable wheels have been lowered to elevate the roller and the hitch has been attached to the towing vehicle but has not yet been operated or manipulated to transfer the unbalanced weight of the roller, which is adjacent the front end thereof, from the front or driven roll to the hitch mechanism of the towing vehicle;

Fig. 4 is a front view of the roller embodying my invention while in its operating rather than towing position, and in which the hitch has been swung upwardly and mechanically locked and the retractable elevating wheels have been elevated;

Fig. 5 is a side view, with parts broken away, showing the roller with the retractable wheels in their elevated position; in other words, with the roller in its operating or rolling position;

Fig. 5A is an end view of a detail of Fig. 5; and

Fig. 6 is a sectional view, with parts omitted, taken on the line 6—6 of Fig. 5, looking in the direction of the arrows.

As seen in the several figures of the drawings, the roller illustrated is of the tandem type and includes a main frame 10 which may be made of laterally spaced longitudinally extending plate members and front and rear cross members, together with other bracing members, if desired. Mounted on the main frame 10 and adjacent the front end thereof is a driven roll 11 which is driven by a motor, such as an internal combustion engine, mounted on the main frame 10 and to the rear of said driven roll 11 which is enclosed, together with the upper portion of the roll 11, by a hood 12. Appropriate drive gearing, such as a variable speed drive including a spur gear drive of well known design, may be provided to interconnect the driving motor with the driven roll 11, such construction being essentially well known and needs no particular illustration or description.

Adjacent the rear end of the vehicle is a steering roll 13 which is carried by a steering yoke 14 mounted for steering movement about an upright axis in an appropriate bearing, not shown, carried by two frame members which also support a platform 15 that forms an extension of the main frame 10 and constitutes a portion of the total frame of the roller. An operator's seat 16 is provided adjacent the rear end of the platform. Steering, speed changing, reversing and brake levers, all designated generally by the reference character 17, are provided within reach of an operator who may be sitting on the seat 16.

Figure 1:
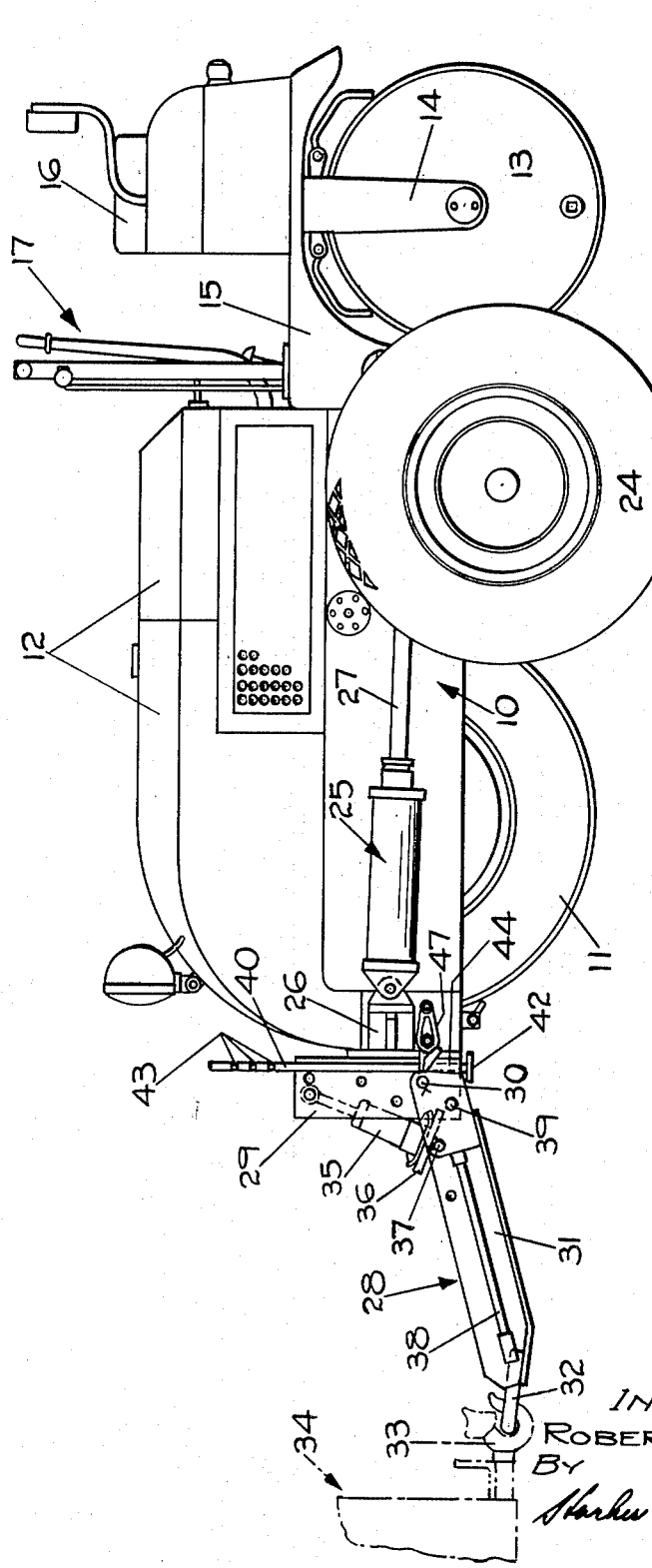
Fig. 1 is a side elevational view of a roller incorporating my invention, the view showing the roller attached to the rear end of a hauling vehicle that supports a portion of the weight of the roller.
Figure 2:
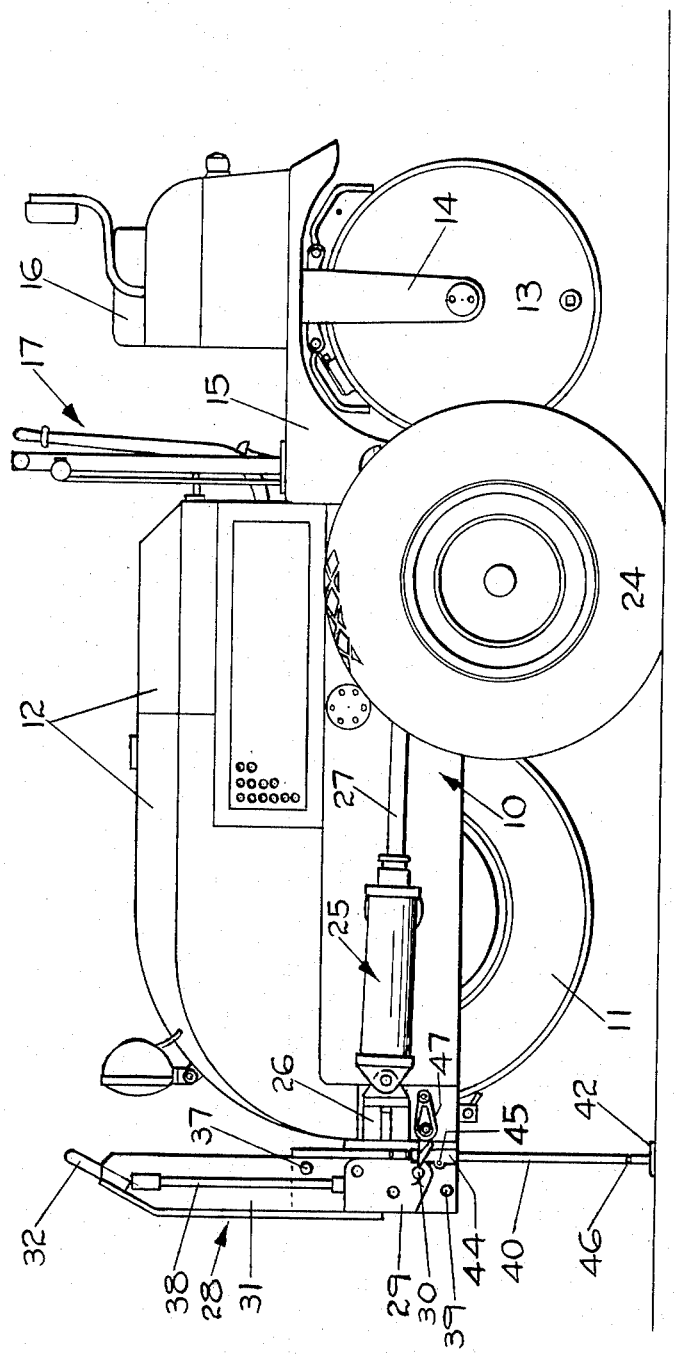
Fig. 2 is a view of the apparatus seen in Fig. 1 but showing the hitch mechanism has been disengaged from the towing vehicle and retracted to a working position and in which the retractable front supports are locked in their expanded or extended positions to stabilize the roller by supporting a portion of the weight at the front end thereof while said roller is elevated or lifted off the ground.

As best seen in Figs. 5 and 6 of the drawings, a transverse horizontal shaft 18 is journaled in appropriate bearings on the main frame 10 closely adjacent to but slightly to the rear of the front or driven roll 11. At one end the shaft 18 has a bell crank arm or lever 19 rigidly attached thereto as by welding. One free end of the bell crank arm or lever 19 carries a spindle 20 (Fig. 6) which in turn carries a wheel 21, a portion of which is preferably a pneumatic tire. The other end of the shaft 18 has a crank arm 22 rigidly attached thereto as by welding and it carries a spindle 23 which also carries a wheel 24 which is preferably a duplicate of the wheel 21. The two wheels 21 and 24 are mounted for rotation on a common axis which is the axis of the spindles 20 and 23 and which is parallel with the axis of rotation of the driven roll 11 and extends transversely of the main frame 10 and transversely of the longitudinal axis of the complete roller. This axis about which the wheels 21 and 24 rotate swings in the arc of a circle as determined by the distance between said axis and the axis of the shaft 18. The two pneumatically tired wheels 21 and 24 constitute retractable elevating or lifting wheels which may be selectively lowered to raise the complete roller off the ground in cooperation with alternate devices hereinafter described which are illustrated particularly in Figs. 1 and 2, respectively. In other words, in said Figs. 1 and 2 the roller is shown elevated with its compacting rolls off the ground. In Fig. 1 it is shown hitched and ready to be transported by a towing vehicle. In Fig. 2 it is shown in a stationary or parked condition. When the retractable wheels are in their elevated or retracted positions, as illustrated in Figs. 4 and 5 of the drawings, the roller is free to operate in its normal manner.

In order to swing the retractable lifting wheels 21 and 24 simultaneously either to their retracted position, as illustrated in Figs. 4 and 5, or to their lifting or elevating position, as illustrated in Figs. 1, 2 and 3, there is a double acting hydraulic cylinder or motor 25, the cylinder portion of which is pivotally attached to a bracket 26 which in turn is rigidly attached to the front end of the main frame 10 adjacent one side thereof. The piston rod 27 of the hydraulic cylinder or motor 25 is pivotally attached to a bracket carried by the arm 22, as best illustrated in Fig. 3 of the drawings. It is, of course, obvious that upon expanding the hydraulic cylinder 25 the two wheels 21 and 24 will be swung about the axis of the shaft 18 to their lowered or roller elevating positions, and upon contracting said cylinder 25 they will be retracted or elevated so as not to contact the ground.

It is to be particularly noted that there is only a single hydraulic cylinder motor 25 employed to swing the two retractable wheels 21 and 24 which are mechanically connected together. This is important because it is very desirable that the retractable wheels move up and down together in synchronism. Otherwise, damage can be done to the roller in case one of the retracting wheels is raised or lowered at a different rate from the other. In other words, the mechanical tying of the two retractable wheels together, with their operation from a single hydraulic cylinder, prevents any lateral tilting or shifting of the roller while it is being raised or lowered. In this connection it is, of course, well known that if two separate hydraulic cylinders are operated simultaneously in parallel they normally will not move in synchronism because the one which has the lighter load (and the loads are scarcely ever identical) will expand faster.

It is also to be noted, particularly by comparison of Figs. 3 and 5 of the drawings, that the hydraulic cylinder 25 is normally parallel with and closely adjacent to one of the horizontal members of the main frame 10. It is consequently well protected particularly on one side and is not unduly exposed in any particular. This protection, of course, prevents unnecessary damage thereto.

It is, of course, obvious that when the wheels 21 and 24 are lowered, the roller is entirely unstable longitudinally or about the axis of the spindles 20 and 23. The center of gravity of the unit is very desirably positioned ahead of the axis of the wheels 21 and 24, or, in other words, the axis of the spindles 20 and 23, so that there is some residual weight forward of this tilting axis which would normally maintain the front roll 11 in contact with the ground when the transporting or retractable wheels are lowered. This is illustrated in Fig. 3 of the drawings.

The consequence of this is that when the roller is being transported a portion of the weight is necessarily carried by the transporting vehicle, and this is desirable to prevent undue swinging of the roller during transportation about the axis of the wheels 21 and 24. I therefore provide a hitch 28 adjacent the front of the roller, located substantially at the transverse center thereof, as illustrated in Fig. 4 of the drawings. The hitch 28 includes an adjustable bracket 29 rigidly attached to the front portion of the main frame 10 and including a pair of spaced upstanding plates. Pivoted to the bracket 29 for swinging movement about a transverse horizontal axis provided by a pivot pin 30 is a tongue 31.

At its front end the tongue 31 is provided with a loop or ring 32 which is adapted to be received by a hitch hook, or the like, 33, carried by a towing vehicle illustrated at 34 in Figs. 1 and 3 of the drawings, which vehicle may be a truck, tractor, or the like.

The first operation of attaching the roller to a towing vehicle and the last operation in detaching it is illustrated in Fig. 3 of the drawings wherein the transporting retractable wheels 21 and 24 have been lowered and locked as hereinafter described. The tongue 31 is then attached to the hitch 33 of the towing vehicle. To raise the driven roll 11 off the ground and thereby to adjust the parts to the positions illustrated in Fig. 1 of the drawings there is an ordinary hand operated lifting jack 35 which may be of the hydraulic type. The base of this jack 35 is carried by a pivoted plate 36 pivotally attached to the tongue 31 by a removable locking pin 37 which is also employed to lock the tongue 28 in its upright position (see Figs. 2 and 4) by extending through aligned holes in tongue 28 and near the top of the bracket 29. When pin 37 is removed from the base of the jack, the jack will swing within the bracket 29 and be held there by the tongue 31 when the latter is locked in its upright position, as seen in Figs. 2 and 4. The piston rod of the jack 35 is pivotally attached by a pivot pin adjacent the top of the bracket 29. A jack handle 38 is removably attached to the tongue 31 by appropriate clip means.

It is obvious by comparing Figs. 1 and 3 that by expanding the jack 35 from the position illustrated in Fig. 3 to the position illustrated in Fig. 1 the unbalanced load on the front of the roller, when the retractable wheels 21 and 24 are down, will transfer the said unbalanced load to the hitch loop 33 of the hauling vehicle 34. The hitch 28 is preferably mechanically locked in its working position, as illustrated in Fig. 1 of the drawings, by inserting a locking pin 39 through aligned holes in the bracket 29 and the tongue 31 to insure against inadvertent contraction of the jack 35 during transportation of the roller. In one commercial machine I provide a plurality of aligned holes through which pin 39 may be selectively inserted, each of which adjusts the tongue 28 to a different height for attaching it to towing hitches carried by the towing vehicle, which hitches may be at different heights. Obviously by removing the pin 39 and collapsing the jack 35 the load may be taken off of the hitch 28, allowing the driven roll 11 to swing down and touch the ground, as illustrated in Fig. 3 of the drawings.

To provide for parking or storing of the roller, with the rolls 11 and 13 off the ground and as illustrated in Fig. 2 of the drawings, I provide a pair of duplicate retractable supporting jacks 40 and 41. Said jacks 40 and 41 are of similar construction and a description of one will suffice for both.

Jack 40 includes an elongated rod provided with a base 42 adapted to contact the ground. The elongated rod is provided at its top with a plurality of pin receiving notches 43 by which it can be locked at selective lengths. The rod slides through the sleeve of a bracket 44 carried on the front end of the main frame 10. Cooperating with the bracket 44 is a locking pin 45 which extends through the cylindrical portion of the bracket 44 and into a selected one of the notches 43 when the supporting jack 40 is lowered.

As best seen in Fig. 2 of the drawings, the elongated rod of the jack 40 is also provided near its bottom with a notch 46 with which the locking pin 45 cooperates to hold the jack 40 in its retracted or elevated position, illustrated, for example, in Figs. 1, 3 and 4 of the drawings. As clearly illustrated in Fig. 4 of the drawings, the two supporting jacks 40 and 41 are located symmetrically on opposite sides of the roller and adjacent the front. Also adjacent the front of the main frame 10 and on opposite sides are towing hooks 47.

It is desirable to lock the retractable wheels 21 and 24 in either of their two extreme positions of adjustment so as not to rely upon the hydraulic cylinder 25 to hold them in such positions. To this end, on that side of the main frame opposite from the motor 25 there is a cam plate 48 (see Fig. 5) which is rigidly attached to the adjacent longitudinally extending member of said main frame 10. Adjacent its lower end the cam plate 48 is provided with a pin receiving hole adapted to receive a spring-pressed pin or detent 49 when said wheels 21 and 24 are elevated (see Fig. 5). When said wheels 21 and 24 are swung from their raised portion to their lowered or roller supporting positions, as illustrated in Figs. 1, 2 and 3, the detent 49 slides over the cam plate 48 and drops into a notch 50 in said cam plate and thereby locks the wheels in their lowered position. It is, of course, necessary to retract the detent 49 from the hole at the bottom of the cam 48 or the notch 50 in order to swing it from one position to the other by the hydraulic cylinder 25. Detent 49 is carried on one of the free ends of the bell crank type arm or lever 19, as clearly illustrated in Fig. 5 of the drawings.

As best seen in Figs. 5 and 5A of the drawings I also provide a spring type over-center latch 51 to lock the steering roll 13 in a level position when the unit is being towed.

Obviously those skilled in the art may make various changes in the details and arrangement of parts without departing from the spirit and scope of the invention as defined by the claim hereto appended, and applicant therefore wishes not to be restricted to the precise construction herein disclosed.

Having thus described and shown an embodiment of the invention, what it is desired to secure by Letters Patent of the United States is:

A tandem road roller including a frame, a driven leveling roll at the front end of said frame, a steering roll at the rear end of said frame, a pair of supporting wheels mounted one at each side of the frame intermediate the front and rear rolls, said wheels being normally maintained in an elevated position above the ground on which the road roller rides, means mounting the wheels on the frame for lowering the wheels into contact with the ground with the periphery of the wheels disposed below the bottoms of the front and rear rolls, said wheel mounting means being located rearwardly of the center of gravity of the road roller whereby lowering of the wheels raises the rear end of the roller off the ground and the wheels and the front roll support the roller in a forwardly tilted position, a towing hitch on the front of the roller, a vertical member fixed on the front of the roller frame, said towing hitch being pivotally mounted on the vertical member and extending forwardly thereof for connection to a towing vehicle while the roller is supported in its forwardly tilted position, said towing hitch including means at its forward end connecting to the towing vehicle for securing the forward end of the hitch in fixed position, power means interposed between said vertical member and the towing hitch operative to change the angular relationship between the towing hitch and the vertical member to swing the front end of the roller upwardly relatively to the towing hitch thereby raising the front roll off the ground, means for maintaining the pivotal joint between the frame and the hitch rigid with the road roller supported on the wheels for transportation by the towing vehicle.

References Cited in the file of this patent

UNITED STATES PATENTS

| | | |
|---|---|---|
| 1,246,696 | Ammann | Nov. 13, 1917 |
| 1,638,294 | Dietly | Aug. 9, 1927 |
| 2,029,659 | Greiner | Feb. 4, 1936 |
| 2,171,255 | Keeler | Aug. 29, 1939 |
| 2,348,445 | Bayer | May 9, 1944 |
| 2,608,143 | Haupt | Aug. 26, 1952 |

FOREIGN PATENTS

| | | |
|---|---|---|
| 679,003 | Germany | July 27, 1939 |